W. A. BOCKIUS.
BUMPER.
APPLICATION FILED OCT. 15, 1921.
1,417,712.
Patented May 30, 1922.
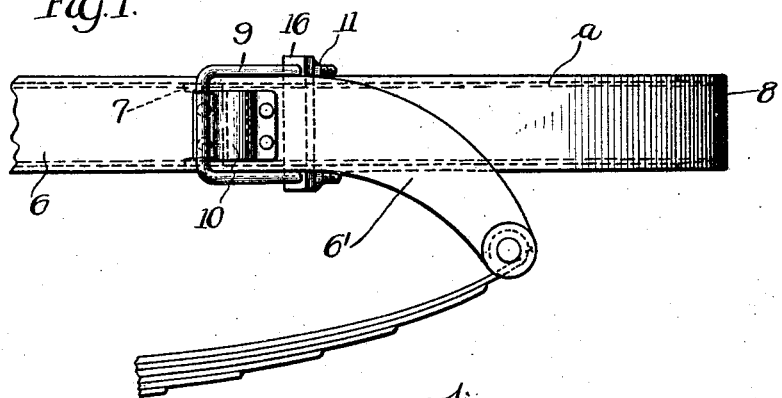
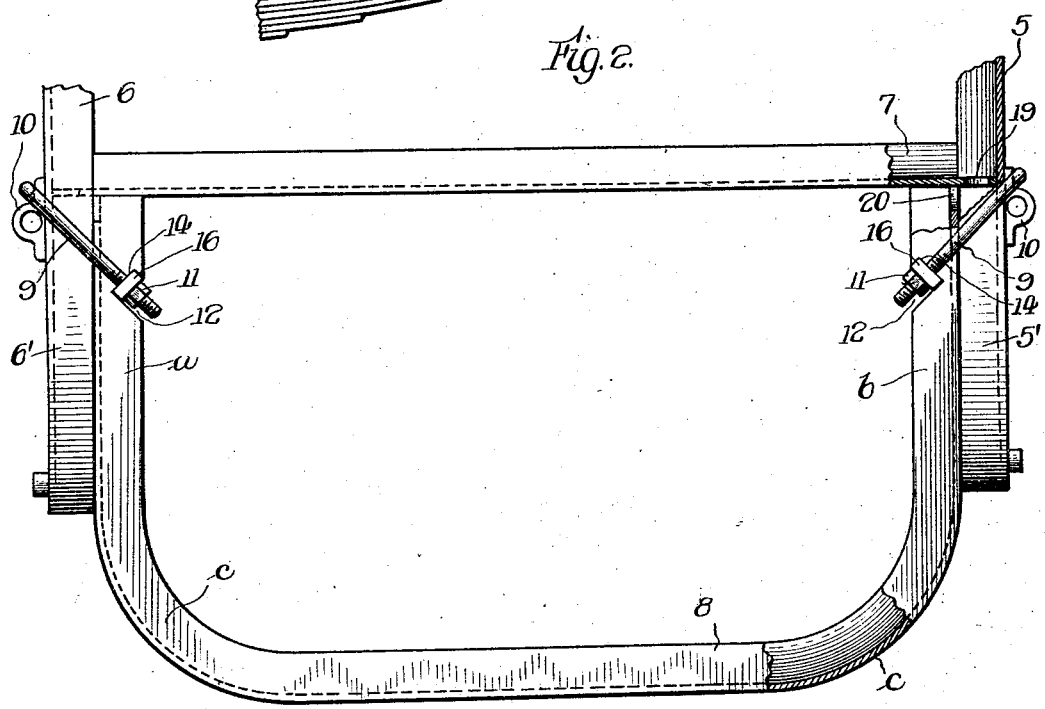
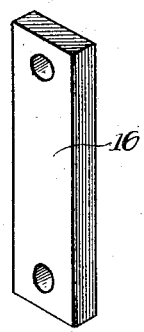
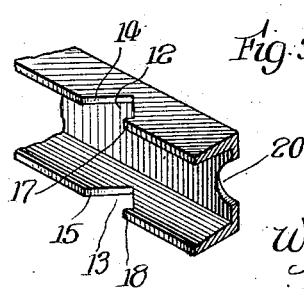
Inventor:
Walter A. Bockius,
Fred Gerlach
his Atty.
Witness:
A. J. Sauser

UNITED STATES PATENT OFFICE.

WALTER A. BOCKIUS, OF WILMETTE, ILLINOIS, ASSIGNOR TO THE BECKLEY-RALSTON COMPANY, OF CHICAGO, ILLINOIS, A CORPORATION OF ILLINOIS.

BUMPER.

1,417,712.

Specification of Letters Patent. Patented May 30, 1922.

Application filed October 15, 1921. Serial No. 507,890.

*To all whom it may concern:*

Be it known that I, WALTER A. BOCKIUS, a citizen of the United States, and a resident of Wilmette, in the county of Cook and State of Illinois, have invented certain new and useful Improvements in Bumpers, of which the following is a full, clear, and exact description.

My invention relates to bumpers for automotive vehicles, particularly that type in which the side beams of the chassis terminate at their front ends in spring supporting horns, and my present invention is designed especially for use on Reo trucks.

The object of the invention is to provide a simple and strong one piece bumper bar together with simple means for rigidly securing the bar at its ends between and against the spring supporting horns of the vehicle chassis without in any wise disturbing the vehicle construction and arrangement or performing any operation thereon such as drilling.

On the accompanying drawing which shows the construction and application of my improved bumper, Fig. 1 is a side elevational view of the front end of a chassis frame with the bumper structure in place thereon, Fig. 2 is a plan view of the parts shown in Fig. 1, Fig. 3 is a perspective view of one end of the bumper bar, and Fig. 4 is a perspective view of one of the bolt anchorage and clamping plates.

On the drawing the chassis side beams 5 and 6 have the spring supporting horns 5' and 6', a cross beam 7 extending between and secured to the chassis beams at the bases of the horns. The various beams are preferably channel shape with the flanges of the chassis beams extending inwardly and those of the cross beam extending rearwardly.

The bumper structure of my invention comprises the U-shape bumper bar 8 bent from a single piece of channel bar with its flanges extending inwardly. The parallel limbs *a* and *b* of the bar are spaced apart at such distance that they will snugly fit against the inner sides of the chassis side beams and horns, with the inner squared ends of the limbs abutting intimately against the cross beam 7. The height of the bumper bar is preferably equal to the height of the chassis side beams and the bar is preferably secured in horizontal position. To secure the bar rigidly in postion, I preferably utilize U or strap bolts 9 which span the limbs *a* and *b* and the chassis side beams and which preferably extend diagonally in order to exert pull components parallel with the limbs *a* and *b* and also components outwardly at right angles with the limbs with the result that the limbs are clamped laterally against the chassis beams and longitudinally against the cross beam 7. I also preferably use as anchorage points for the strap bolts, the lamp bracket supporting bases 10 which form part of the chassis equipment, and I thereby eliminate the necessity of providing special anchorage means on the chassis frame. To afford accurate seating for the nuts 11 of the strap bolts I cut rectangular diagonally extending slots 12 and 13 in the upper and lower flanges of each limb *a* and *b*, these notches being in vertical alinement and affording the seats 14 and 15 for the bridge bars 16 which are of a thickness to snugly fit into the slots. The seats 14 and 15 are at right angles to the plane of the strap bolt so that the bridge bars will be at right angles with the bolt limbs and will afford accurate seating for the nuts. The slots are cut inwardly a sufficient distance to leave the abutment sections or tongues 17 and 18 on the flanges for securely holding the bridge bars in place. To apply the bumper structure the bar 8 is slipped in between the spring horns and against the cross beam 7. The strap bolts which are of a width to intimately receive the bar and chassis beams are now slipped in place with their yokes against the brackets 10, and the bridge bars are then slipped on the ends of the bolts and into the slots and against the seats 14 and 15. The nuts 11 are now applied and drawn up tight. Such drawing of the bolts will result in longitudinal pull components on the limbs *a* and *b* which will force and hold their ends into rigid abutment engagement with the beam 7, and the resulting lateral components will force the limbs snugly against the inner sides of the chassis beams and horns, the strap bolts also forming then rigid brackets for holding the bumper bar against vertical displacement. The tongues 17 and 18 will lock the bridge bars rigidly in the slots and will prevent any lateral displacement thereof while the nuts are being drawn up tight.

When the bumper structure is thus rigidly secured in place, it forms a strong, rigid and effective guard against front, side and diagonal bumps, the corners c of the bar 8 being well rounded so that diagonal bumps will tend to glance off. As the limbs of the U bar are intimately clamped against the springhorn ends, such ends are materially strengthened and reenforced against bending or crumpling. The strap bolts do not take up any of the bump blows but such blows are transmitted to the cross beam 7 and to the chassis frame of the vehicle. The bumper structure also effectively protects the lamp supporting brackets and lamps.

On chassis frames of the type referred to, openings 19 are provided in the ends of the cross beam 7 for accomodating the leads for the lamps supported on the brackets 10. In order to take care of these leads, I provide openings 20 in the ends of the webs of the limbs a and b, the leads being then extended through the openings 19 and 20 to the lamps.

I do not desire to be limited to the exact construction and arrangement shown as changes and modifications are possible which would still come within the scope of the invention.

I claim as follows:

1. The combination with the side beams of a chassis frame of a vehicle, inner abutments on said beams and outer abutments thereon, of a bumper structure comprising a bumper bar having parallel supporting limbs engaging against the inner sides of said beams and against the inner abutments thereon, and securing members anchored on said outer abutments and surrounding said beams and limbs.

2. The combination with the side beams of a chassis frame of automotive vehicles, inner abutments on said beams and outer abutments thereon, of a bumper structure comprising a bumper bar having parallel supporting limbs engaging against the inner sides of said beams at the front ends thereof and engaging also against said inner abutments, and strap bolts anchored against said outer abutments and receiving said beams and limbs, said strap bolts extending diagonally to exert longitudinal and lateral pull components on said limbs to secure them against said beams and said inner abutments.

3. The combination with the side beams of a vehicle chassis, inner abutments on said beams and outer abutments thereon, of a bumper structure comprising a bar having supporting limbs engaging against the inner sides of said beams and against said inner abutments, said limbs having notches, and strap bolts receiving said limbs and side beams and engaging in said notches and against said outer abutments.

4. The combination with the side beams of a vehicle chassis, inner abutments on said beams and outer abutments thereon, of a bumper structure comprising a bar having supporting limbs engaging against the inner sides of said beams and against said inner abutments, said limbs having notches, and strap bolts receiving said limbs and side beams and engaging in said notches and against said outer abutments, said bolts extending diagonally to exert horizontal and lateral pull components on said limbs to thereby secure them against said inner abutments and against said beams.

5. The combination with vehicle chassis side beams having inner and outer abutments thereon, of a bumper structure comprising a bumper bar having supporting limbs extending therefrom, said limbs engaging with their sides against the inner sides of said beams and with their ends against said inner abutments, said limbs having diagonally extending seats in front of said outer abutments, and diagonally extending strap bolts engaging against said seats and said outer abutments to exert longitudinal and lateral pull components on said limbs to securely hold them against said inner abutments and against said side beams.

6. The combination with vehicle chassis side beams having inner and outer abutments thereon, of a bumper structure comprising a bumper bar having supporting limbs extending therefrom, said limbs engaging with their sides against the inner sides of said beams and with their ends against said inner abutments, said limbs having diagonally extending seats in front of said outer abutments, and diagonally extending strap bolts engaging against said seats and said outer abutments to exert longitudinal and lateral pull components on said limbs to securely hold them against said inner abutments and against said side beams, said strap bolts engaging intimately against the top and bottom sides of said side beams to thereby serve as brackets for supporting said bumper structure bar against vertical displacement.

7. The combination with the side beams of a vehicle chassis and inner and outer abutments thereon, of a bumper structure comprising a bumper bar, parallel supporting limbs, said limbs engaging against the inner sides of said chassis side beams and with their ends against said inner abutments, abutments on said limbs, and diagonally extending strap structures intimately surrounding said limbs and side beams and engaging against said limb abutments and said beam outer abutments for holding said limbs intimately against said side beams and said inner abutments and against vertical displacement.

8. The combination with the side beams of a vehicle chassis structure, inner abutments on said beams and outer abutments thereon, of a bumper structure comprising a bumper bar having supporting limbs of channel cross section, said limbs engaging with their webs against the inner sides of said beams and with their flanges extending inwardly and engaging at their ends against said inner abutments, notches in the flanges of the respective limbs, washer plates seated in said notches, and strap bolts hooking around said outer abutments and extending through said washer plates and having nuts for engaging said plates.

9. The combination with the side beams of a vehicle chassis structure, inner abutments on said beams and outer abutments thereon, of a bumper structure comprising a bumper bar having supporting limbs of channel cross section, said limbs engaging with their webs against the inner sides of said beams and with their flanges extending inwardly and engaging at their ends against said inner abutments, notches in the flanges of the respective limbs, washer plates seated in said notches, and strap bolts hooking around said outer abutments and extending through said washer plates and having nuts for engaging said plates, said strap bolts extending diagonally to exert longitudinal and lateral pull components on said limbs to thereby hold them against said inner abutments and against said side beams.

10. The combination with the side beams of a vehicle chassis, inner abutments on said beams, and lamp structure supporting brackets secured at the outer sides of said beams, of a bumper structure comprising a bumper section, parallel supporting limbs of channel cross section with their flanges extending inwardly, said limbs abutting with their webs against the inner sides of said chassis beams and with their ends against said inner abutments, notches in the flanges of the respective limbs forwardly of said lamp structure supporting brackets, and strap bolts intimately surrounding said side beams and limbs and engaging said brackets and in said notches.

11. The combination with the side beams of a vehicle chassis, inner abutments on said beams, and lamp structure supporting brackets secured on the outer sides thereof, of a bumper structure comprising a bumper section, parallel supporting limbs extending from said bumper section, said limbs being of channel shape with their flanges extending inwardly and engaging with their webs against the inner sides of said side beams and with their ends against said inner abutments, notches in the flanges of the respective beams forwardly of said brackets, said notches affording diagonally extending seats, washer plates engaging against said seats, and diagonally extending strap bolts hooked around said brackets and extending through said washer plates and having nuts for engaging against said plates, said strap bolts intimately surrounding said side beams and limbs to secure them against said side beams and said inner abutments and against vertical displacement.

12. The combination with the side beams of a vehicle chassis frame, inner abutments on said beams, and outer abutments thereon, of a bumper structure comprising a U-shape bumper bar formed from a single piece of channel beam with the flanges extending inwardly, the limbs of said bumper bar engaging against the inner sides of said chassis beams and against said inner abutments, the flanges of the respective limbs having notches therein in a plane forwardly from the plane of the outer abutments on said beams, and diagonally extending strap bolts receiving said beams and limbs and engaging said outer abutments and in said notches.

13. The combination with the chassis frame of a vehicle comprising side beams terminating at their front ends in spring supporting horns, a cross beam connecting said side beams inwardly of said horn ends, lamp structure supporting brackets on the outsides of said beams, of a bumper structure comprising a U-shape bumper bar formed of a single piece of channel beam with the flanges extending inwardly, the limbs of said bumper bar engaging against the inner sides of said chassis beams and with their ends abutting against said cross beam, notches in the flanges of the respective limbs, washer plates seated in said notches, and diagonally extending strap bolts hooked around said brackets and extending through said washer plates and having nuts engaging said plates whereby longitudinal and lateral pull effort is exerted on said limbs to hold them against said side beams and said cross beam, said straps intimately engaging with said beams and limbs to support said limbs against vertical displacement.

In witness whereof, I hereunto subscribe my name this 23rd day of September, A. D., 1921.

WALTER A. BOCKIUS.